March 16, 1965    H. A. BALDWIN    3,173,372
FLUID ENERGY SYSTEM
Filed Sept. 25, 1963

INVENTOR.
HOWARD A. BALDWIN
BY
Meyers & Peterson
ATTORNEYS

United States Patent Office 3,173,372
Patented Mar. 16, 1965

3,173,372
FLUID ENERGY SYSTEM
Howard A. Baldwin, Tucson, Ariz., assignor to Arizona Research Foundation, Inc., a corporation of Arizona
Filed Sept. 25, 1963, Ser. No. 311,522
4 Claims. (Cl. 103—44)

This invention relates generally to fluid energy systems, and pertains more particularly to such a system involving the use of traveling pressure waves for pumping fluids, measuring reflected wave energy, and the like.

One important object of the invention is to provide a basic system for the foregoing character that will have a variety of uses. For instance, it is envisaged that the system will find utility as a peristaltic pump, for measuring reflected acoustic wave energy from a boundary between two fluids, and for observing fluid depths or thickness under varying conditions.

Another object is to provide a fluid energy system that will be extremely sensitive to pressure fluctuations. More specifically, when peristaltic pumping is to be undertaken, then the rate of pumped or discharged fluid will be precisely in accordance with the fundamental pressure variations producing the pumping action. Similarly, when measuring reflected acoustic wave energy from a boundary between two fluids, the system will be responsive to the reflected energy so that reflective or absorptive properties of a given medium can be accurately determined.

Yet another object of the invention is to provide a system of the above type that will be easy to manufacture, of low cost, and which will have an extremely lengthy, useful life.

These and other objects and advantages of my invention will more fully appear from the following description, made in connection with the accompanying drawing, wherein like reference characters refer to the same or similar parts throughout the several views and in which.

Figure 1:
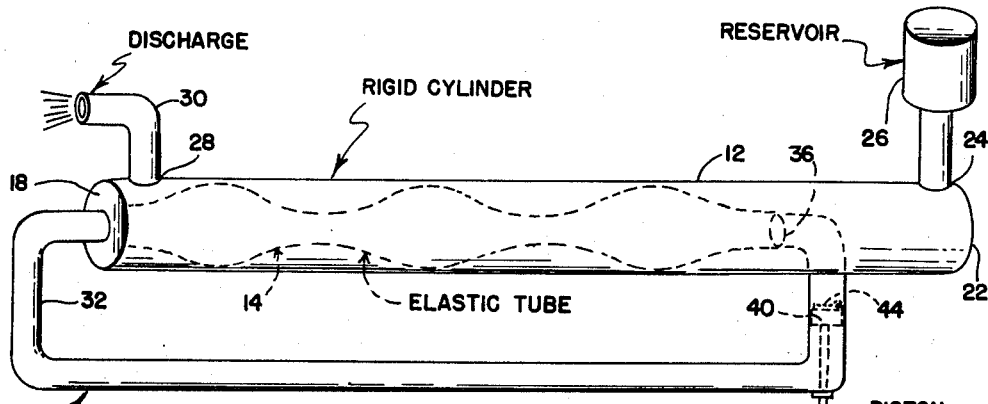
FIGURE 1 is a schematic view of one form my invention may take, the particular view showing the invention used as a peristaltic pump.
Figure 2:
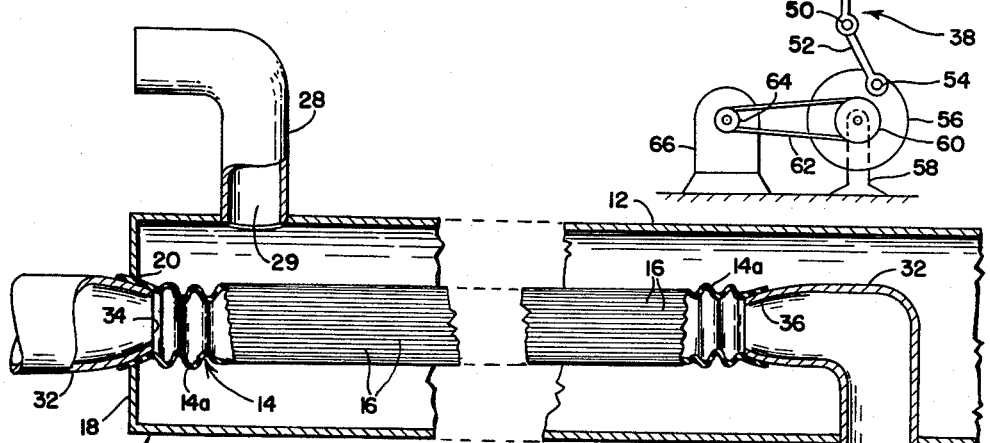
FIGURE 2 is a longitudinal sectional view of FIGURE 1 in order to show to better advantage the elastic tubular member housed within the outer rigid member.

Referring first to FIGURES 1 and 2, the peristaltic pump there depicted has been denoted generally by the reference numeral 10. The pumping system 10 includes a rigid cylinder 12 in which is longitudinally disposed an elastic tube 14, such as natural rubber latex or neoprene of surgical quality, and which will usually have a wall thickness on the order of from 0.002 to 0.006 inch. A multiplicity of fine fibers or filaments 16 of considerably less elasticity than the tube 14, such as nylon, are situated around the circumference of the elastic tube 14, being secured to the outer surface thereof throughout substantially their entire lengths. While the specific number of fibers or filaments 16 can be varied, depending upon the particular circumstances, it can be stated that the number should be relatively large and would usually involve several hundred to one thousand individual fibers. Stated somewhat differently, the elastic tube 14, together with the fibers 16, constitutes a two-phase structure composed of materials of widely different moduli of elasticity. In this regard, the tube 14 itself is as flexible and as elastic as possible, whereas the very fine fibers 16 which are imbedded in the surface of the elastic tube 14 are appreciably less elastic.

As best view in FIGURE 2, it can be seen that one end of the rigid tube 12 has an annular closure plate 18 provided with a central aperture 20. The closure plate 18 serves to centrally position the left end of the elastic tube 14 within the cylinder 12. The other end of the rigid cylinder 12 is closed at 22 (FIGURE 1). Adjacent the closed end 22 is an inlet port 24 and a reservoir 26 surmounts the cylinder 12 so as to provide a first fluid, such as water, to the interior of the cylinder 12. At will be better understood as the description progresses, a discharge port 28 is provided adjacent the end of the cylinder 12 having the annular closure plate 18 therein, the port 28 having an upwardly extending discharge tube 30 associated therewith via which the fluid, such as water, is discharged during the pumping action.

A conduit 32 has one end 34 thereof connected to the end of the elastic tube 14 which is contained in the closure 18 and extends inwardly through the rigid cylinder 12 so that its other end 36 can be connected to the other end of the elastic tube 14 to provide a closed fluid circuit.

Although other pumping mechanisms can be resorted to to cause a second fluid to be forced through the elastic tube 14 and the conduit 32, a simplified piston pump 38 has been illustrated. It will be observed that the piston pump 38 includes a piston 40 having an aperture 42 extending therethrough which is closed on the pumping stroke by a flap valve 44 having a hinged connection 46 with the upper side of the piston 40 at best discerned from FIGURE 2. The piston 40 has a downwardly extending piston rod 48 and a transverse pin 50 connects the exposed or lower end of the piston rod 48 to a connecting rod 52 which has its other end connected by a pin 54 to a wheel or disc 56. In other words, the wheel or disc 56 serves as a crank for moving the piston 40 up and down within the confines of the vertical portion of the conduit 32 shown at the right in FIGURES 1 and 2. The wheel or disc 56 is supported on a standard or upright 58 and has thereon a pulley 60. Entrained about the pulley 60 is a flexible belt 62 which also encircles a driving pulley 64 on an electric motor 66.

For the sake of a simplified explanation when presenting an operational sequence, it may be assumed that the piston pump 38 causes the second fluid to vary in a sinusoidal fashion, although admittedly the specific piston pump 38 shown does not produce such a variation. However, pumps that do produce a true sinusoidal pumping action are available. At any rate, when the piston 40 is moved upwardly, it can be seen that this causes the second fluid which is contained in the conduit 32 to be forced through the end 36 of the conduit 32 so that it enters the elastic tube 14.

Remembering that we are assuming that a sinusoidal pressure is produced, the fluid pumped by the piston pump 38 will cause a traveling pressure wave to be developed within the elastic tube 14. As this pressure wave, and subsequent ones, traverse the elastic tube 14, the tube 14 will appear substantially as it is shown in phantom outline in FIGURE 1. The degree of amplitude variation in the elastic tube 14 will depend, quite obviously, on the amount of relative elasticity between the material constituting the tube 14 and the fibers 16. In some instances, especially when relatively inelastic fibers 16 are utilized, some slack along the axis of the tube 14 will be desired; this can be accomplished in various ways, such as by employing bellows portions 14a at the ends. In a sense, the phantom outline position shown in FIGURE 1 is a somewhat exaggerated condition, especially inasmuch as the fibers 16 shown in FIGURE 2 have been shown quite taut. In any event, it will be understood, however, that the tube 14 and the fibers 16 imbedded thereabout will not be pulled taut initially as shown in FIGURE 2 but will have some slack so that the various fibers 16 (either by reason of their material or otherwise) can assume the undulated appearance pictured in FIGURE 1. The point to be kept in mind is that the successive waves are transmitted through the elastic tube 14 and as these waves move from the right to the left in FIGURES 1 and 2, the first fluid between the rigid cylinder 12 and the elastic tube 14 will be also caused to advance from right to left. Thus, the fluid entrained between the cylinder 12 and the tube 14 will be pumped and the pumping action will produce a discharge via the outlet port 18, the discharge having a characteristic corresponding to the particular traveling wave configuration produced by the piston pump 38, in this instance, a sinusoidal one.

Stated somewhat differently, the piston pump 38 will produce a traveling wave action having successive nodes and aninodes of pressure occurring on a time relation basis. The effect is to produce a traveling wave, as already indicated, which varies in three dimensions within the elastic tube 14. Owing to the elasticity or flexibility of the tube 14, the tube actually takes the shape of its waveform, the phantom outline appearance in FIGURE 1 being intended to provide this impression. The traveling wave will force the first fluid, that is, the fluid between the cylinder 12 and the elastic tube 14, along in the direction of the travel of the wave. In effect, energy is extracted from the wave and utilized to pump a fluid against gravity or against the back pressure of a restricted orifice, depending upon what end result is desired. In this way, the velocity with which the first-mentioned fluid may be moved is dependent on the phase velocity of the pressure wave and will be quite high in actual practice.

Although use of the system 10 for peristaltic pumping is quite important, nonetheless other uses of the energy system are contemplated. For instance, it is also planned that the invention will find utility in the measurement of reflected acoustic energy from a boundary between two fluids or between a fluid and a solid. Accordingly, attention is now directed to FIGURE 3 where a somewhat modified system has been denoted generally by the reference numeral 10a. Hereagain, a rigid cylinder is employed, the cylinder in this instance having been given the reference numeral 12a. As a matter of fact, various elements are closely analogous to each other with respect to the system 10a and the previously-described system 10; hence, the suffix "a" has been selected to distinguish between the closely similar elements. Thus, the cylinder 12a has an annular closure plate 18a at the left and a somewhat similar plate 22a at the right. Centrally located within the cylinder 12a is an annular partition or divider plate separating the interior of the cylinder 12a into first and second sections 70, 72.

In order to measure or detect the difference in pressure between the two sections 70, 72, a manometer gauge 74 is utilized, such a gauge 74 having therein mercury 76 that is displaced in accordance with any differences in pressure.

Since the present system 10a is to be employed for the purpose of measuring acoustical energy, a vibrator is utilized for producing appropriate power oscillations. This has been shown in the form of a piezoelectric resonator 78 which is energized by a power oscillator 80 operating in the audio frequency range.

As with the system 10, the system 10a includes an elastic tube 14 having the fibers 16 imbedded in its outer surface. This elastic tube 14 extends from the right end of the cylinder 12a where it is juxtaposed against the resonator 78 to a tube 82 at the left end thereof, the elastic tube 14 extending through the annular partition 68. The tube 82 confronts the medium labelled 84 whose properties are unknown and the reflected characteristics thereof are to be determined by the system or device 10a.

Figure 3:
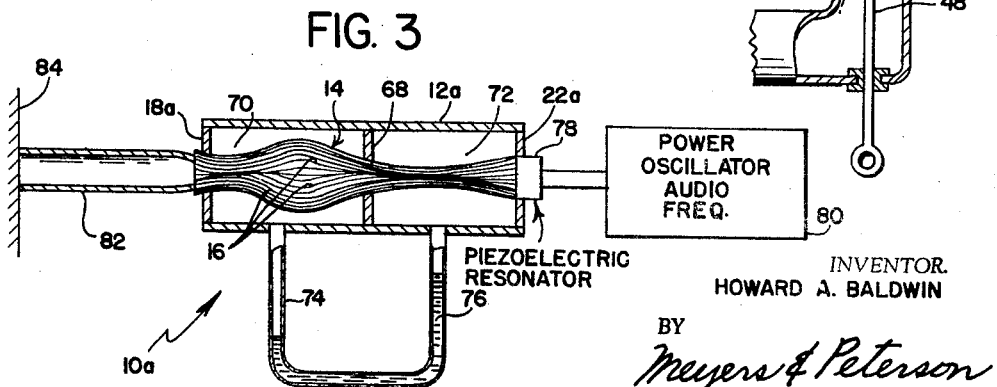
FIGURE 3 is a sectional view corresponding generally to FIGURE 2 but showing the system modified for use as a device suitable for measuring reflected acoustic energy.

In operating the modified system 10a, the power oscillator 80 is started and the piezoelectric resonator 78 produces traveling wave energy that moves from the right to the left in FIGURE 3. It will be assumed, as with the system 10, that a first fluid is contained within the confines of the cylinder 12a, occupying both the sections 70 and 72. A second fluid is contained in the elastic tube 14. Thus, due to the traveling waves that are produced by the resonator 78, it follows that a standing wave pattern can be formed. In producing the standing waves, it will be appreciated that the length of the tube 82 can be selected so that the reflected waves reinforce the forward pressure waves and a configuration of the elastic tube 14, such as that appearing in FIGURE 3, can be achieved. The amount of acoustic energy that is reflected will depend upon the properties of the medium 84, whether such medium be a fluid or a solid. Thus, with a given resonator 78 and the appropriate length of tube 82, the difference in pressure between the section 70 and the section 72 will be representative of the amount of energy being reflected. Consequently, the difference in level of the mercury 76 in the manometer gauge 74 will be indicative of the pressure differences existing between the sections 70, 72 and thereby representative of the reflective capabilities of the medium 84.

It will, of course, be understood that various changes may be made in the form, details, arrangements and proportions in the parts without departing from the scope of my invention as set forth in the appended claims.

What is claimed is:

1. A fluid energy system comprising:
   (a) a rigid, hollow cylinder of one diameter;
   (b) an elastic tube of a smaller diameter axially disposed within said cylinder and having relatively inelastic fibers secured thereto in a longitudinal direction;
   (c) an annular member at one end of said cylinder for fixedly supporting the adjacent end of said tube and closing the space therebetween;
   (d) means adjacent said one end of said cylinder providing a discharge port;
   (e) means adjacent the other end of said cylinder for supplying a first fluid to the space between said cylinder and said tube;
   (f) means for fixedly supporting the other end of said tube;
   (g) means adjacent said other end of said tube for supplying a pressure-varying second fluid to the interior of said tube,
   (h) whereby a traveling pressure wave is produced within said tube to cause pumping of said first fluid with a discharge thereof via said port.

2. A fluid energy system comprising:
   (a) a rigid, hollow cylinder of one diameter;
   (b) an elastic tube of a smaller diameter axially disposed within said cylinder;
   (c) means at each end of said cylinder for supporting the ends of said tube and confining a first fluid between said cylinder and tube;
   (d) a partition within said cylinder for supporting an intermediate portion of said tube and dividing the interior of said cylinder into two sections;
   (e) means at the other end of said tube for preventing the escape of a second fluid from said other end and for producing pressure waves within said tube;
   (f) means near the adjacent end of said tube for reflecting said pressure waves in accordance with the reflective characteristics of a medium in the path of said waves, and
   (g) means in communication with said two cylindrical sections for measuring pressure differences existing between said sections when a standing wave pattern is produced within said tube.

3. A fluid energy system comprising:
   (a) a rigid tubular member for accommodating a first fluid;
   (b) an elastic tubular member longitudinally disposed within said rigid tubular member for accommodating a second fluid;
   (c) a plurality of closely spaced fibers of lesser elasticity extending axially along at least one surface of said elastic tubular member and secured thereto throughout substantially their entire length;

(d) rigid means at one end of said rigid tubular member providing an opening for the reception of the adjacent end of said elastic member;

(e) means for producing pressure variations in said second fluid at the other end of the member containing said second fluid;

(f) whereby wave energy is transmitted via the first of said fluids;

(g) a partition member within said rigid tubular member through which said elastic tubular member extends, and (h) means connected to the interior of said rigid tubular member at each side of said partition member to provide an indication of pressure differences existing to either side of said partition member when said adjacent end of the elastic tubular member is directed toward an energy-reflective medium.

4. A fluid energy system comprising:

(a) a rigid tubular member for accommodating a first fluid;

(b) an elastic tubular member longitudinally disposed within said rigid tubular member for accommodating a second fluid;

(c) a plurality of closely spaced fibers of lesser elasticity extending axially along at least one surface of said elastic tubular member and secured thereto throughout substantially their entire length;

(d) means supporting the opposite ends of said elastic tubular member in a fixed relationship with each other, (e) said elastic member having an outlet at one end thereof providing communication thorugh the adjacent end of said rigid member;

(f) means for producing pressure variations in one of said fluids at the other end of the member containing said one fluid, (g) whereby wave energy is transmitted via the other of said fluids.

References Cited by the Examiner
UNITED STATES PATENTS

| 49,410 | 8/65 | Huss | 103—44 |
|---|---|---|---|
| 2,814,993 | 12/57 | Schmidt | 103—46 |
| 3,021,793 | 2/52 | Bolstad | 103—152 |

LAURENCE V. EFNER, *Primary Examiner.*

ROBERT M. WALKER, *Examiner.*